Sept. 24, 1929.  G. W. FROST  1,729,337
SIGNAL LIGHT AND METHOD OF MAKING SAME
Filed July 19, 1926   2 Sheets-Sheet 2
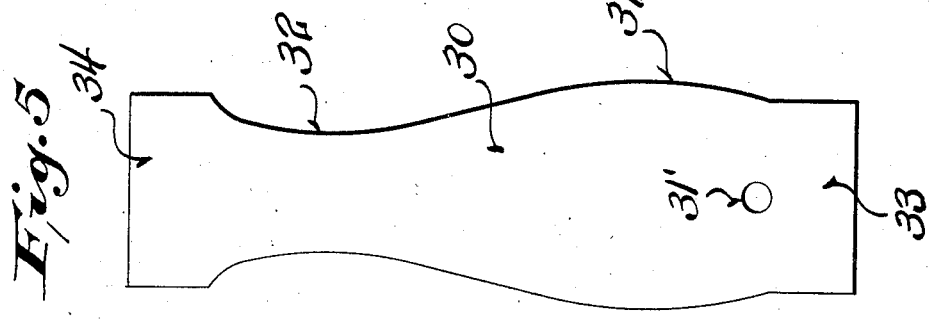
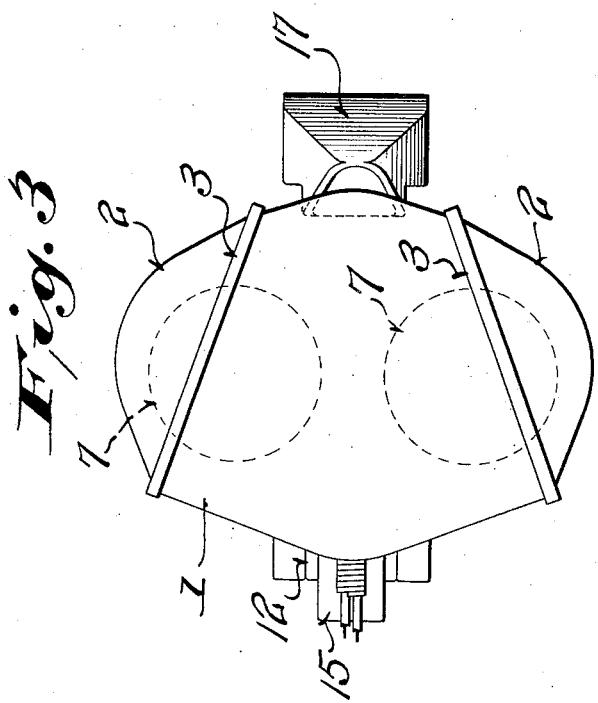
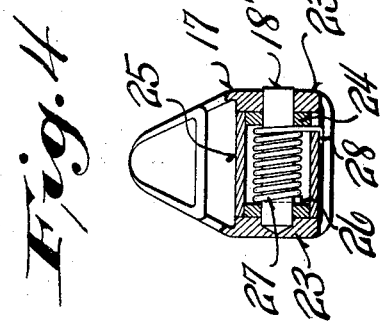
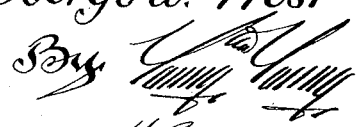

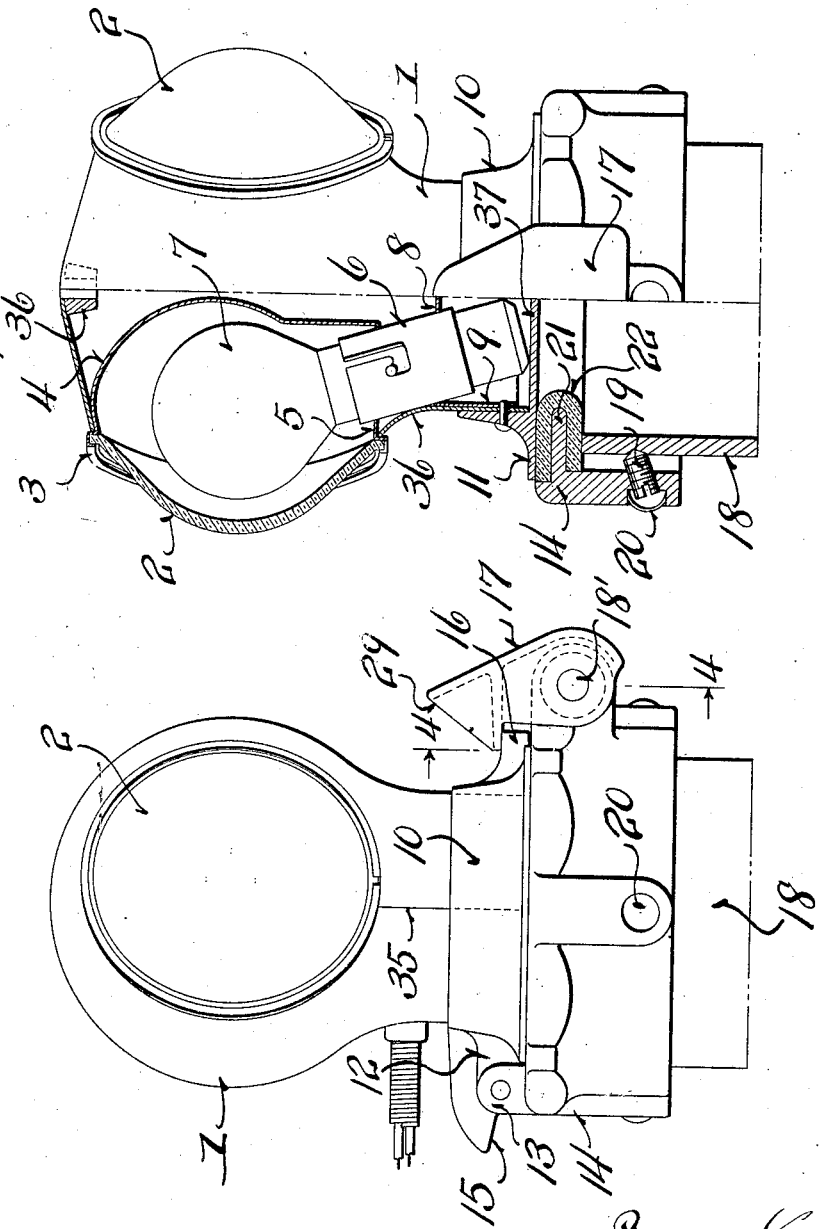

Patented Sept. 24, 1929

1,729,337

UNITED STATES PATENT OFFICE

GEORGE W. FROST, OF MILWAUKEE, WISCONSIN

SIGNAL LIGHT AND METHOD OF MAKING SAME

Application filed July 19, 1926. Serial No. 123,392.

This invention relates to signal lights and method of making same.

Objects of this invention are to provide a signal light which is adapted to be mounted upon the radiator neck of an automobile, and which is so constructed that it will fit a large number of different sized necks, and is substantially universal in its mounting upon the different makes of cars, and which is theft proof.

Further objects are to provide a novel form of signal light which replaces the radiator cap and contains the signal lamps and lenses together with the reflectors and other accessories, and which is so constructed that it may be readily rocked out of the way to permit filling of the radiator and snapped into locked position to seal the radiator neck.

Further objects are to provide a novel form of latch for the light so that it will act as a bumper to cushion violent shocks, as for example, when the device is slammed shut, and which will thus relieve the filaments from danger of breaking.

Further objects are to provide a novel method of making the signal light so that it may be composed primarily from sheet metal, and in which a single sheet metal blank may be shaped into the desired double light contour, to thus avoid the expense of complicated castings or a multiplicity of parts for the main casing of the light.

Further objects are to provide a novel form of light for attachment to the radiator neck which is so constructed that it will not twist and become displaced during use.

An embodiment of the invention is shown in the accompanying drawings in which:—

Figure 1 is a side elevation of the device;
Figure 2 is a front view thereof with a part in section;
Figure 3 is a plan view of the device;
Figure 4 is a sectional view on the line 4—4 of Figure 1;
Figure 5 is a view of the blank from which the main casing of the light is formed.

Referring to the drawings, it will be seen that the signal light comprises a main casing 1, provided with two forwardly and outwardly pointing lenses 2. These lenses are preferably made of different colors, such as red and green, for instance.

The shell 1 is formed from sheet metal in a manner hereinafter described, and the lenses are preferably held in place by spinning or beading a portion 3 of the reflectors, as shown in Figure 2.

Within the casing 1, a pair of parabolic reflectors 4 are positioned, as shown particularly in Figure 2, and these reflectors are silvered on their inner sides. These reflectors throw the light forwardly, laterally, and downwardly.

The lower portion of the reflectors are provided with a horizontal bottom 5 which is apertured and is adapted to receive the slanting socket 6 for the electric bulb or lamp 7. Further, it is to be noted that the lower portion of the casing receives a cup-shaped member whose top 8 is apertured, as shown in Figure 2, to receive the socket 6. This inverted cup-shaped member is provided with cylindrical side walls 9, which are received within the side walls of the casing 1. If desired, the portion 3 may be integral with the reflector 4 or with the casing 1.

As shown in Figure 2, this portion of the device is integral with the reflector 4.

The bottom of the casing 1 is cylindrical in contour and is received within the cylindrical neck 10 of the bottom fitting. This fitting is provided with an annular flange 11 and with an outwardly projecting rear portion 12 (see Figs. 1 and 3) which is pivotally mounted between the lugs 13 of the neck receiving member 14. Preferably the extension 12 is provided with a rear lip 15, so as to limit the rearward rocking of the light. The forward portion of the member 10 is provided with an extension 16 which is held in place by means of the overhanging portion of a latch 17. This latch is pivotally carried by the member 14.

The member 14 is in reality an open topped cap which is locked to the radiator neck 18 by means of a plurality of upwardly slanting pointed screws 19. These screws are covered by means of caps 20, as shown in Figure 2, such caps being driven into place after the screws are set to prevent removal or tampering with the screws.

The member 14 is provided with an inwardly directed flange 21 about which a gasket 22 is folded. This gasket forms a seal between the flange and the radiator neck 18, and also between the flange 11 of the signal light and the flange 21 of the neck receiving member.

The construction of the latch 17 is best illustrated in Figure 4. From this figure, it will be seen that a pivot pin 18' is driven through apertures formed in the side lugs 23 of the latch 17, and through apertures formed in bearing washers 24 carried within the cylindrical lug 25. The lug 25 is integral with the member 14. The pin 18' is slotted and receives one end 26 of a spring 27. The other end 28 of the spring is received in a slot in the sleeve 25. It is to be noted that one of the apertures in the lugs 23 of the latch 17 is a blind opening, and that the pin 18' is driven flush with the outer face of the latch. Thus the pin can not be removed as it has a driving fit with the lugs 23 of the latch. It has a loose fit with the washers 24, and it will be seen that the twist imparted to the pin 18' is transmitted to the latch and urges such latch into locking position. It is to be noted in reference to this latch that its rear face 29 is cam shaped or slanting. Thus, when the light is slammed shut after the radiator has been filled, the projection 16 will strike the face 29 and the blow will be cushioned, thus relieving the filaments in the lamps from jar. Further, the latch will snap into locking position without any thought on the part of the operator.

The method of making the signal light is extremely simple and, therefore, materially cheapens the resulting article. The signal light is formed from a blank 30, as shown in Figure 5, and this blank, it will be seen, has a widened portion 31 and a narrowed neck portion 32. It has end portions 33 and 34. The enlarged portion 31 forms the rear of the casing 1, and the narrowed portion 32 forms the front thereof. It is to be noted that an opening 31' is formed in the blank and such opening acts as a centering opening during forming, and also provides an opening for the reception of the bushing and wires in the finished light. In making the light, the blank is either rolled or pressed so as to bulge the portions 31 and 32, and round the portions 33 and 34. The edges of the portions 33 and 34 abut to form the vertical seams 35 (see Figure 1) and the portions 33 and 34 form the cylindrical bottom portion of the casing 1. The seams 35 are brazed, soldered, or welded. The cylindrical portion receives the cylindrical walls 9 (Figure 2) of the inverted cup-shaped member and the parts are held in place by the dowel pin illustrated in Figure 2.

It will be seen, therefore, that a very simple method of making the signal light has been disclosed by this invention, and it will be seen that complicated castings are avoided. If desired, a lug or boss 36 may be secured to the underside of the top of the casing 1, as shown in Figure 2, and such boss and the adjacent portion of the casing may be apertured for the reception of an ornament.

It is to be noted particularly that the device is so constructed that no screws or bolts are needed for holding the reflectors and lamp sockets in place. As shown most clearly in Figure 2, the lamp sockets 6 are slipped through the aperture in the bottom 5 of the reflector and through the aperture in the top 8 of the cup-shaped interior member. This socket is angularly arranged and binds against the sides of these apertures, and against the curved portion of the casing 1, where the neck of the casing joins the body portion, as indicated at 36 in Figure 2. Thus, a three-point bearing for the socket 6 is secured, and the metal walls of the portions 8 and 5 bite into and bear against the socket 6, thus locking the parts in place without the use of screws.

It will be seen further that the device is attractive in appearance, is of extremely simple and practical construction, and may be very cheaply manufactured. Further, it is to be seen that in the practice of this invention, the usual complicated castings, securing screws and other devices of this type are eliminated and, instead, a novel mode of locking the lamp sockets and reflectors in place has been disclosed.

Further, it is to be noted that the member 10 is provided with a bottom web 37 (see Figure 2) which prevents any possibility of short circuiting the electrical connections due to leaking or spraying of water into the interior of the casing 1.

This device, therefore, serves not only as a novel form of radiator cap, but in addition, serves as a signal light which is operated to indicate the direction of travel of the vehicle by lighting one or the other, or both of the lamps.

Although the invention has been described in considerable detail, such description is intended as illustrative rather than limiting as the invention may be variously embodied and as the scope of such invention is to be determined as claimed.

I claim:—

A signal light adapted to be attached to the radiator neck of an automobile, comprising a main casing having outwardly and forwardly opening apertures, reflectors located within said apertures and extending into said casing, and lamp sockets positioned within said reflectors and passing through apertures in the lower portions thereof, said casing having a neck portion provided with a transverse wall having apertures through which said lamp sockets pass, said lamp sockets binding against the sides of said apertures and against said casing to lock said reflectors and lamp sockets in place, lamps carried within said sockets, and means carried by the lower portion of said casing for attachment to the radiator neck.

In testimony that I claim the foregoing I have hereunto set my hand at Milwaukee, in the county of Milwaukee and State of Wisconsin.

GEORGE W. FROST.